(12) United States Patent
Suzuki

(10) Patent No.: US 10,701,325 B2
(45) Date of Patent: Jun. 30, 2020

(54) MULTI-PROJECTION SYSTEM, PROJECTOR, AND METHOD FOR CONTROLLING PROJECTOR

(71) Applicant: SEIKO EPSON CORPORATION, Tokyo (JP)

(72) Inventor: Naoki Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/032,452

(22) Filed: Jul. 11, 2018

(65) Prior Publication Data

US 2019/0037181 A1   Jan. 31, 2019

(30) Foreign Application Priority Data

Jul. 25, 2017  (JP) ................... 2017-143270

(51) Int. Cl.
```
H04N 9/31      (2006.01)
H04N 5/445     (2011.01)
G03B 37/04     (2006.01)
G02F 1/1347    (2006.01)
G03B 21/00     (2006.01)
```
(52) U.S. Cl.
CPC ......... *H04N 9/3147* (2013.01); *G02F 1/1347* (2013.01); *G03B 21/006* (2013.01); *G03B 37/04* (2013.01); *H04N 5/445* (2013.01); *H04N 9/3179* (2013.01); *H04N 9/3197* (2013.01)

(58) Field of Classification Search
CPC .......................... H04N 9/3147; G02F 1/1347
USPC ............... 348/745, 744, 383, 806, 746, 747; 353/82, 69, 94
See application file for complete search history.

(56) References Cited

U.S. PATENT DOCUMENTS

2005/0007561 A1*  1/2005  Koyama ............ H04N 5/44513
                                                  353/94
2016/0139869 A1   5/2016  Ito

FOREIGN PATENT DOCUMENTS

| JP | 2007-226052 A | 9/2007 |
| JP | 2008-216805 A | 9/2008 |
| JP | 2015-152617 A | 8/2015 |
| JP | 2016-95417 A  | 5/2016 |

* cited by examiner

*Primary Examiner* — Jefferey F Harold
*Assistant Examiner* — Jean W Desir
(74) *Attorney, Agent, or Firm* — Oliff PLC

(57) ABSTRACT

A multi-projection system that combines projection images projected by a plurality of projectors to allow an image containing an OSD image for adjustment of the projectors to be displayed on a projection surface includes an instruction receiving section that receives an adjustment instruction indicating one of first adjustment in which the plurality of projectors are adjusted altogether and second adjustment in which the plurality of projectors are individually adjusted and a switching section that switches the aspect of the OSD image to another in accordance with the adjustment instruction.

13 Claims, 12 Drawing Sheets

MULTI-PROJECTION SYSTEM, PROJECTOR, AND METHOD FOR CONTROLLING PROJECTOR

CROSS-REFERENCE

The entire disclosure of Japanese Patent Application No. 2017-143270, filed Jul. 25, 2017 is expressly incorporated by reference herein.

BACKGROUND

1. Technical Field

The present invention relates to a multi-projection system, a projector, and a method for controlling the projector.

2. Related Art

JP-A-2016-95417 describes a multi-projection system that can combine images (hereinafter each referred to as "background image") projected from a plurality of projectors with one another to generate a combined image and display an OSD (on-screen display) image that is a menu image on the combined image.

Adjustment of the projectors in the multi-projection system is conceivably classified into a case where the plurality of projectors are adjusted altogether (hereinafter referred to as "overall adjustment") and a case where the referred to as "individual adjustment").

If the aspect of an OSD image for the overall adjustment is the same as the aspect of an OSD image for the individual adjustment, a user undesirably cannot determine in some cases whether the OSD image is an image for the overall adjustment or for the individual adjustment.

SUMMARY

An advantage of some aspects of the invention is to provide a technology that allows a user to determine whether an OSD image for adjustment is an image for overall adjustment or for individual adjustment.

A multi-projection system according to an aspect of the invention is a multi-projection system that combines projection images projected by a plurality of projectors to allow an image containing an OSD image for adjustment of the projectors to be displayed on a projection surface, the multi-projection system including an instruction receiving section that receives an adjustment instruction indicating one of first adjustment in which the plurality of projectors are adjusted altogether and second adjustment in which the plurality of projectors are individually adjusted and a switching section that switches an aspect of the OSD image to another in accordance with the adjustment instruction.

According to the aspect of the invention, the aspect of the OSD image is switched to another in accordance with the adjustment instruction, which represents one of the first adjustment and the second adjustment. A user can therefore determine whether the OSD image is an image for the first adjustment (overall adjustment) or for the second adjustment (individual adjustment) based on the aspect of the OSD image.

In the aspect of the invention, it is desirable that the OSD image contains an adjustment image for adjustment of settings of the projectors, and that the switching section switches the number of adjustment images in the OSD image to another in accordance with the adjustment instruction.

According to the aspect of the invention with this configuration, the user can determine whether the OSD image is an image for the first adjustment (overall adjustment) or for the second adjustment (individual adjustment) based on the number of adjustment images.

In the aspect of the invention, it is desirable that the switching section sets the aspect of the OSD image to be an aspect in which the OSD image contains one adjustment image in the case where the adjustment instruction indicates the first adjustment, and that the switching section sets the aspect of the OSD image to be an aspect in which the projection images projected by at least two of the plurality of projectors contain the adjustment images in the case where the adjustment instruction indicates the second adjustment.

According to the aspect of the invention with this configuration, since the projection images projected by at least two projectors contain the adjustment images, the user can readily perform the second adjustment (individual adjustment) using the OSD image.

In the aspect of the invention, it is desirable that the aspect in which the OSD image contains one adjustment image is an aspect in which the one adjustment image straddles the projection images projected by the at least two of the plurality of projectors.

According to the aspect of the invention with this configuration, the adjustment image can be enlarged as compared with a case where the adjustment image falls within one projection image.

In the aspect of the invention, it is desirable that the aspect in which the OSD image contains one adjustment image is an aspect in which the one adjustment image falls within the projection image projected by one of the plurality of projectors.

According to the aspect of the invention with this configuration, in which the adjustment image falls within the projection image projected by one projector, even if adjacent projection images are positionally shifted from each other on the projection surface, a situation in which the adjustment image is difficult to see due to the positional shift can be avoided.

In the aspect of the invention, it is desirable that a first projector that is one of the plurality of projectors includes an acceptance section that accepts an adjustment content set by using the OSD image, an adjuster that adjusts settings of the projector based on the adjustment content, and a provider that provides a second projector different from the first projector out of the plurality of projectors with the adjustment content in the case where the adjustment instruction indicates the first adjustment.

According to the aspect of the invention with this configuration, in the case where the adjustment instruction indicates the first adjustment, and when the first projector is adjusted by using the OSD image, the adjustment content is provided to the second projector. The first and second projectors can therefore be adjusted altogether by using the common adjustment content.

In the aspect of the invention, it is desirable that the provider does not provide the second projector with the adjustment content in the case where the adjustment instruction indicates the second adjustment.

According to the aspect of the invention with this configuration, a situation in which the adjustment content used in the first projector but unnecessary for the second projector is provided to the second projector can be avoided during the individual adjustment.

A projector according to another aspect of the invention is a projector that is allowed to belong to a multi-projection system that combines projection images projected by a plurality of projectors to allow an image containing an OSD image for adjustment of the projectors to be displayed on a projection surface, the projector including an instruction receiving section that receives an adjustment instruction indicating one of first adjustment in which the plurality of projectors are adjusted altogether and second adjustment in which the plurality of projectors are individually adjusted in a specific situation in which the projector belongs to the multi-projection system and a switching section that switches an aspect of the OSD image to another in accordance with the adjustment instruction in the specific situation.

According to the aspect of the invention, the aspect of the OSD image is switched to another in accordance with the adjustment instruction, which represents one of the first adjustment and the second adjustment. The user can therefore determine whether the OSD image is an image for the first adjustment (overall adjustment) or for the second adjustment (individual adjustment) based on the aspect of the OSD image.

In the aspect of the invention, it is desirable that the OSD image contains an adjustment image for adjustment of settings of the projectors, and that the switching section switches the number of adjustment images in the OSD image to another in accordance with the adjustment instruction.

According to the aspect of the invention with this configuration, the user can determine whether the OSD image is an image for the first adjustment (overall adjustment) or for the second adjustment (individual adjustment) based on the number of adjustment images.

In the aspect of the invention, it is desirable that the switching section sets the aspect of the OSD image to be an aspect in which the OSD image contains one adjustment image in the case where the adjustment instruction indicates the first adjustment, and that the switching section sets the aspect of the OSD image to be an aspect in which the projection images projected by at least two of the plurality of projectors contain the adjustment images in the case where the adjustment instruction indicates the second adjustment.

According to the aspect of the invention with this configuration, since the projection images projected by at least two projectors contain the adjustment images, the user can readily perform the second adjustment (individual adjustment) using the OSD image.

In the aspect of the invention, it is desirable that the aspect in which the OSD image contains one adjustment image is an aspect in which the one adjustment image straddles the projection images projected by the at least two of the plurality of projectors.

According to the aspect of the invention with this configuration, the adjustment image can be enlarged as compared with a case where the adjustment image falls within one projection image.

In the aspect of the invention, it is desirable that the aspect in which the OSD image contains one adjustment image is an aspect in which the one adjustment image falls within the projection image projected by one of the plurality of projectors.

According to the aspect of the invention with this configuration, in which the adjustment image falls within the projection image projected by one projector, even if adjacent projection images are positionally shifted from each other on the projection surface, a situation in which the adjustment image is difficult to see due to the positional shift can be avoided.

In the aspect of the invention, the projector desirably further includes an acceptance section that accepts an adjustment content set by using the OSD image, an adjuster that adjusts settings of the projector based on the adjustment content, and a provider that provides another projector different from the projector out of the plurality of projectors with the adjustment content in the case where the adjustment instruction indicates the first adjustment.

According to the aspect of the invention with this configuration, in the case where the adjustment instruction indicates the first adjustment, and when the projector is adjusted by using the OSD image, the adjustment content is provided to the other projector. The projector and the other projector can therefore be adjusted altogether by using the common adjustment content.

In the aspect of the invention, it is desirable that the provider does not provide the other projector with the adjustment content in the case where the adjustment instruction indicates the second adjustment.

According to the aspect of the invention with this configuration, a situation in which the adjustment content used in the projector but unnecessary for the other projector is provided to the other projector can be avoided during the individual adjustment.

A method for controlling a projector according to another aspect of the invention is a method for controlling a projector that is allowed to belong to a multi-projection system that combines projection images projected by a plurality of projectors to allow an image containing an OSD image for adjustment of the projectors to be displayed on a projection surface, the method including receiving an adjustment instruction indicating one of first adjustment in which the plurality of projectors are adjusted altogether and second adjustment in which the plurality of projectors are individually adjusted in a specific situation in which the projector belongs to the multi-projection system and switching an aspect of the OSD image to another in accordance with the adjustment instruction in the specific situation.

According to the aspect of the invention, the aspect of the OSD image is switched to another in accordance with the adjustment instruction, which represents one of the first adjustment and the second adjustment. The user can therefore determine whether the OSD image is an image for the first adjustment (overall adjustment) or for the second adjustment (individual adjustment) based on the aspect of the OSD image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
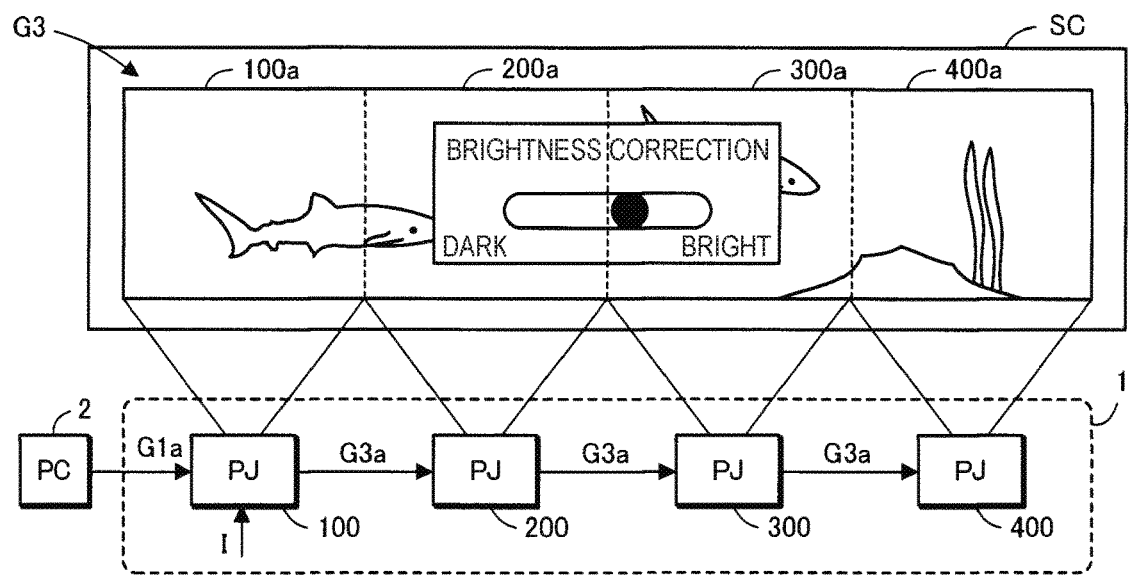
FIG. 1 shows a multi-projection system according to a first embodiment.

An embodiment according to the invention will be described below with reference to the drawings. In the drawings, the dimension and scale of each portion differ from actual values as appropriate. The embodiment described below is a preferable specific example of the invention. A variety of technically preferable restrictions are therefore imposed on the embodiment. The scope of the invention is, however, not limited to the restricted form of the embodiment unless otherwise particularly stated in the following description that a restriction is imposed on the invention.

First Embodiment

FIG. 1 shows a multi-projection system 1 according to a first embodiment.

The multi-projection system 1 includes projectors (PJ) 100, 200, 300, and 400. The number of projectors that form the multi-projection system 1 is not limited to four and only needs to be at least two. The projectors 100 to 400 are connected to each other in a daisy chain scheme. The connection among the projectors 100 to 400 is not limited to the daisy chain scheme and can be changed as appropriate.

The projectors 100 to 400 are allowed to belong to the multi-projection system 1. The projector 100 is an example of a first projector. The projector 100 functions as a master projector. The projectors 200 to 400 each function as a slave projector. The projector 200 is an example of a second projector and another projector.

In the multi-projection system 1, a projection image 100a projected by the projector 100, a projection image 200a projected by the projector 200, a projection image 300a projected by the projector 300, and a projection image 400a projected by the projector 400 are combined with one another on a projection surface SC to form an image. In the present embodiment, the multi-projection system 1 can combine the projection images 100a, 200a, 300a, and 400a with one another to display an image containing an OSD image for adjustment of the projectors (hereinafter also simply referred to as "OSD image") on the projection surface SC. The projection surface SC is, for example, a screen or a wall.

Figure 2:
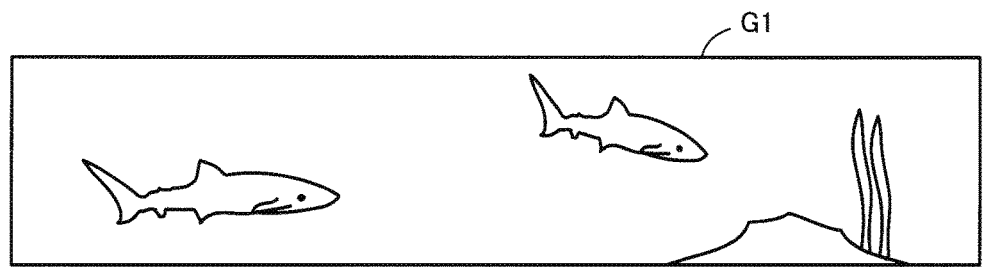
FIG. 2 shows an example of an image.

The projector 100 receives image information G1a, which represents an image G1 having a resolution of 8K1k (8k in horizontal direction and 1k in vertical direction), from a personal computer (hereinafter referred to as "PC") 2 in a specific situation in which the projector 100 belongs to the multi-projection system 1 (hereinafter simply referred to as "specific situation"). FIG. 2 shows an example of the image G1. The resolution of the image G1 is not limited to 8K1K and can be changed as appropriate.

The projector 100 can superimpose an OSD image on the image G1. The resolution of the OSD image is the same as the resolution of the image G1. The projector 100 produces combined image information representing a combined image that is the image G1 on which the OSD image has been superimposed. The combined image is an example of an image containing an OSD image.

The projector 100 receives an adjustment instruction I relating to adjustment of the projectors in the specific situation. The adjustment instruction I indicates one of the overall adjustment, in which the projectors 100 to 400 are adjusted altogether, and the individual adjustment, in which the projectors 100 to 400 are each individually adjusted. The overall adjustment is an example of first adjustment. The individual adjustment is an example of second adjustment. The projector 100 switches the aspect of the OSD image in accordance with the adjustment instruction I.

Figure 3:
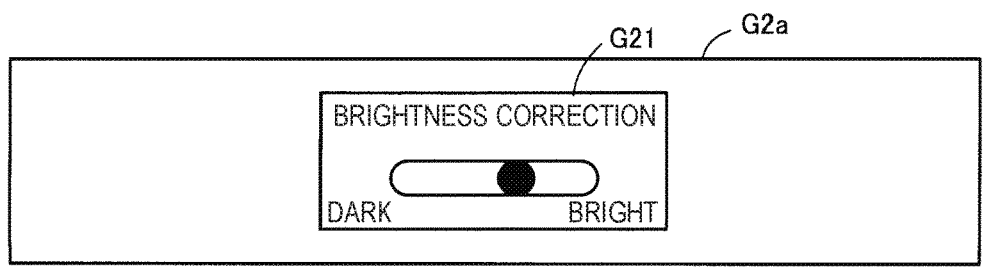
FIG. 3 shows an aspect of an OSD image in a case where an adjustment instruction indicates overall adjustment.

FIG. 3 shows an example of the aspect of an OSD image G2a in the case where the adjustment instruction I indicates the overall adjustment. The OSD image G2a shows one adjustment image (image for adjusting brightness of projection image) G21. The adjustment image G21 is an example of the adjustment image for adjusting the settings of the projectors. The adjustment image G21 is not limited to an image for adjusting the brightness of a projection image and can be changed as appropriate. For example, the adjustment image G21 may be an image for adjusting the setting of the sharpness of an image.

In the case where the adjustment instruction I indicates the overall adjustment, the projector 100 produces combined image information G3a representing a combined image G3, which is the image G1 on which the OSD image G2a has been superimposed. In the present embodiment, the resolution of the combined image G3 is the same as the resolution of the image G1.

Figure 4:
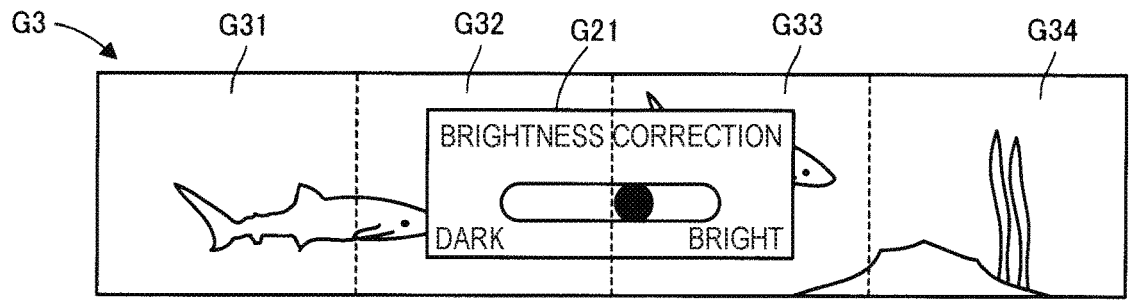
FIG. 4 shows an example of a combined image.

FIG. 4 shows an example of the combined image G3.

The combined image G3 is formed of a partial image G31, the projection of which the projector 100 is responsible for, a partial image G32, the projection of which the projector 200 is responsible for, a partial image G33, the projection of which the projector 300 is responsible for, and a partial image G34, the projection of which the projector 400 is responsible for. The resolution of each of the partial images G31, G32, G33, and G34 is 2K1K. That is, the partial images G31, G32, G33, and G34 are four 2K1K partial images divided from the 8K1K combined image.

In the combined image G3, the single adjustment image G21 straddles the partial image G32 (projection image 200a) and the partial image G33 (projection image 300a). The single adjustment image G21 may instead straddle two or more projection images out of the projection images 100a, 200a, 300a, and 400a.

Figure 5:
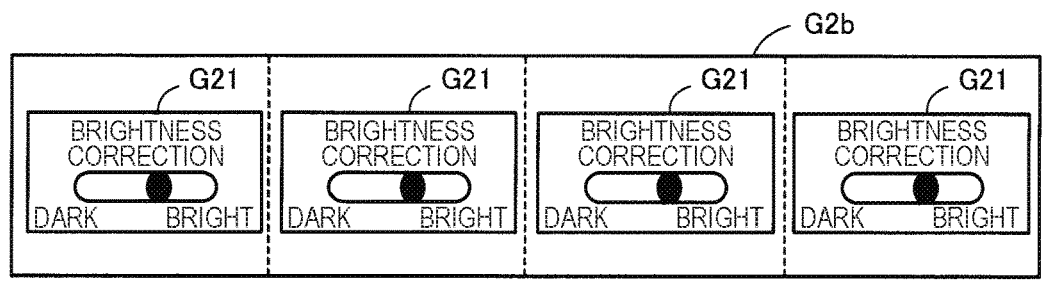
FIG. 5 shows an aspect of an OSD image in a case where the adjustment instruction indicates individual adjustment.

FIG. 5 shows an example of the aspect of an OSD image G2b in the case where the adjustment instruction I indicates the individual adjustment. The OSD image G2b shows four adjustment images G21.

In the case where the adjustment instruction I indicates the individual adjustment, the projector 100 produces combined image information G4a representing a combined image G4, which is the image G1 on which the OSD image G2b has been superimposed. In the present embodiment, the resolution of the combined image G4 is the same as the resolution of the image G1.

Figure 6:
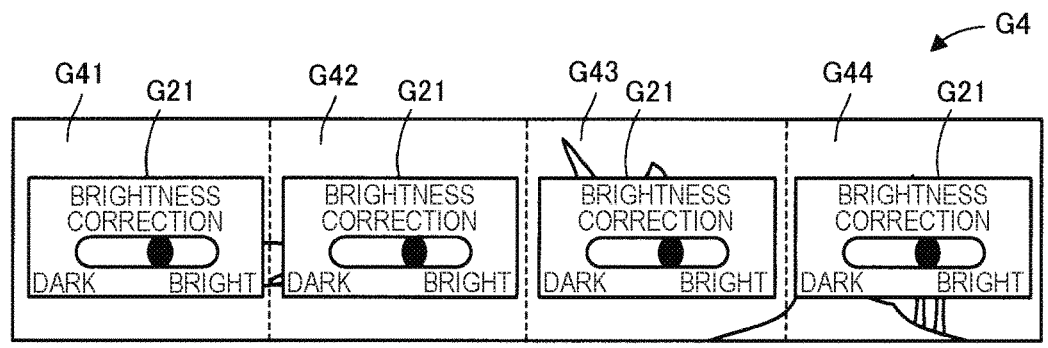
FIG. 6 shows an example of another combined image.

FIG. 6 shows an example of the combined image G4.

The combined image G4 is formed of a partial image G41, the projection of which the projector 100 is responsible for, a partial image G42, the projection of which the projector 200 is responsible for, a partial image G43, the projection of which the projector 300 is responsible for, and a partial image G44, the projection of which the projector 400 is responsible for. The resolution of each of the partial images G41, G42, G43, and G44 is 2K1K, as is the resolution of each of the partial images G31, G32, G33, and G34.

Figure 7:
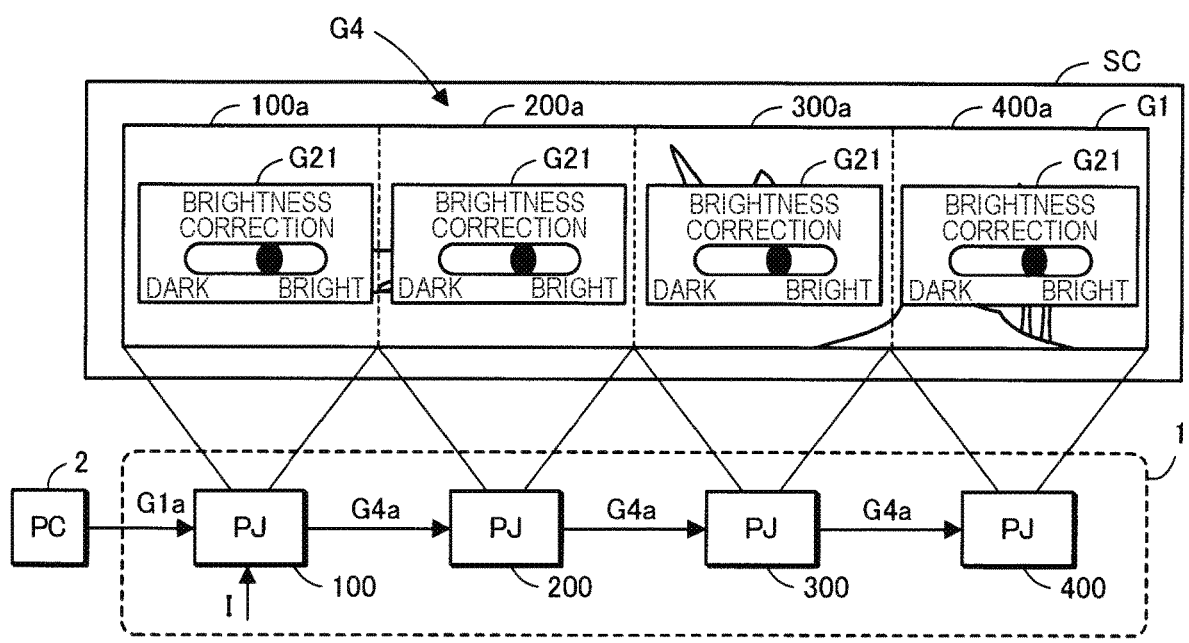
FIG. 7 shows an example of projection of the other combined image.

The projector 100 projects the partial image G41 as the projection image 100a, as shown in FIG. 7. The projector 200 projects the partial image G42 as the projection image 200a. The projector 300 projects the partial image G43 as the projection image 300a. The projector 400 projects the partial image G44 as the projection image 400a.

Figure 8:
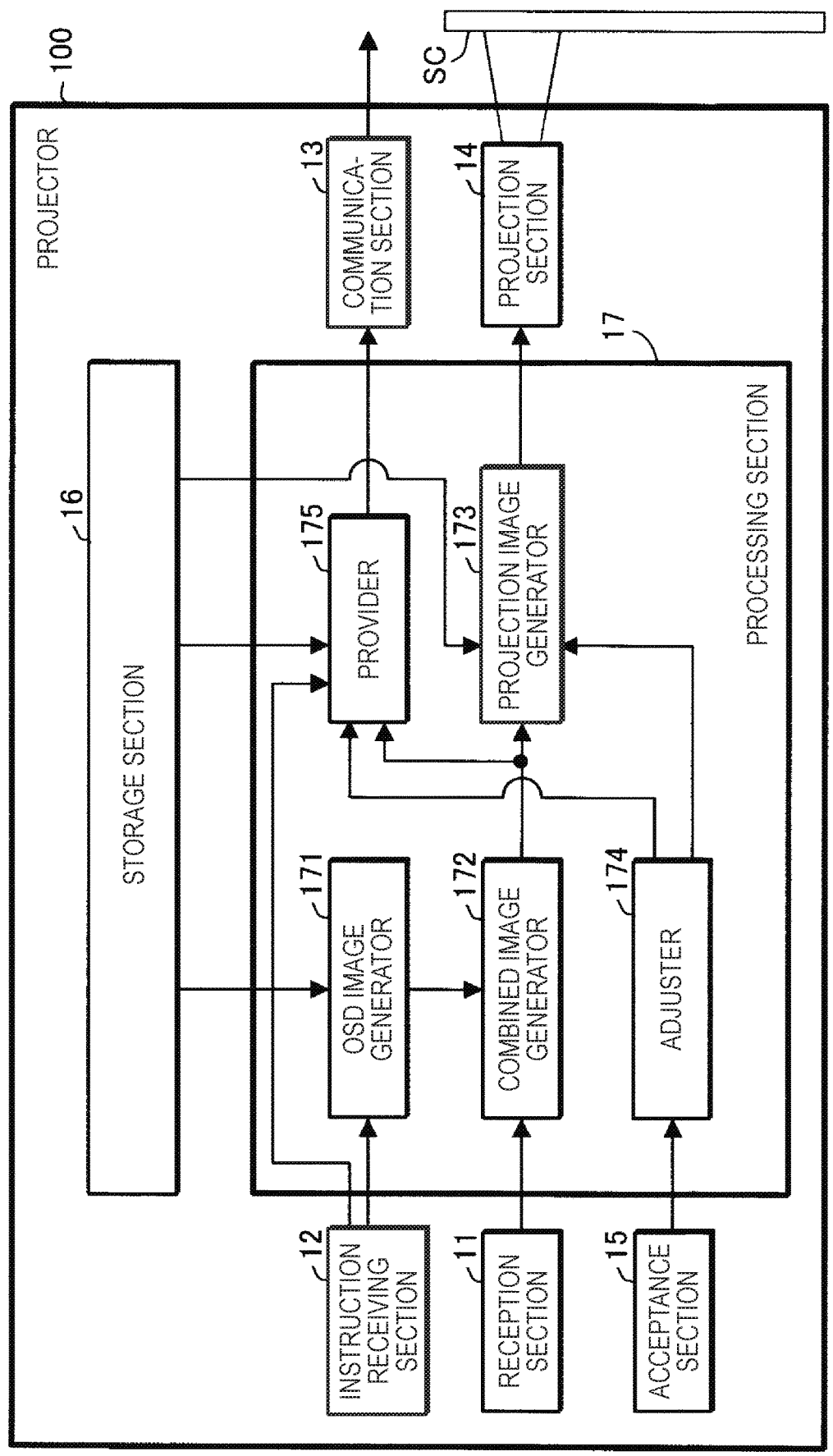
FIG. 8 shows an example of a projector.

FIG. 8 shows an example of the projector 100. The projector 100 includes a reception section 11, an instruction receiving section 12, a communication section 13, a projection section 14, an acceptance section 15, a storage section 16, and a processing section 17.

The reception section 11 is, for example, a terminal to which image information is inputted. The reception section 11 receives the image information G1a from the PC 2.

The instruction receiving section 12 is formed, for example, of operation buttons or a touch panel. The instruction receiving section 12 receives a user's instruction, for example, the adjustment instruction I in the specific situation.

The communication section 13 communicates with the projector 200. The communication section 13 transmits, for example, combined image information to the projector 200.

The projection section 14 projects and displays the partial image for which the projector 100 is responsible (partial image G31 or G41, for example) on the projection surface SC.

Figure 9:
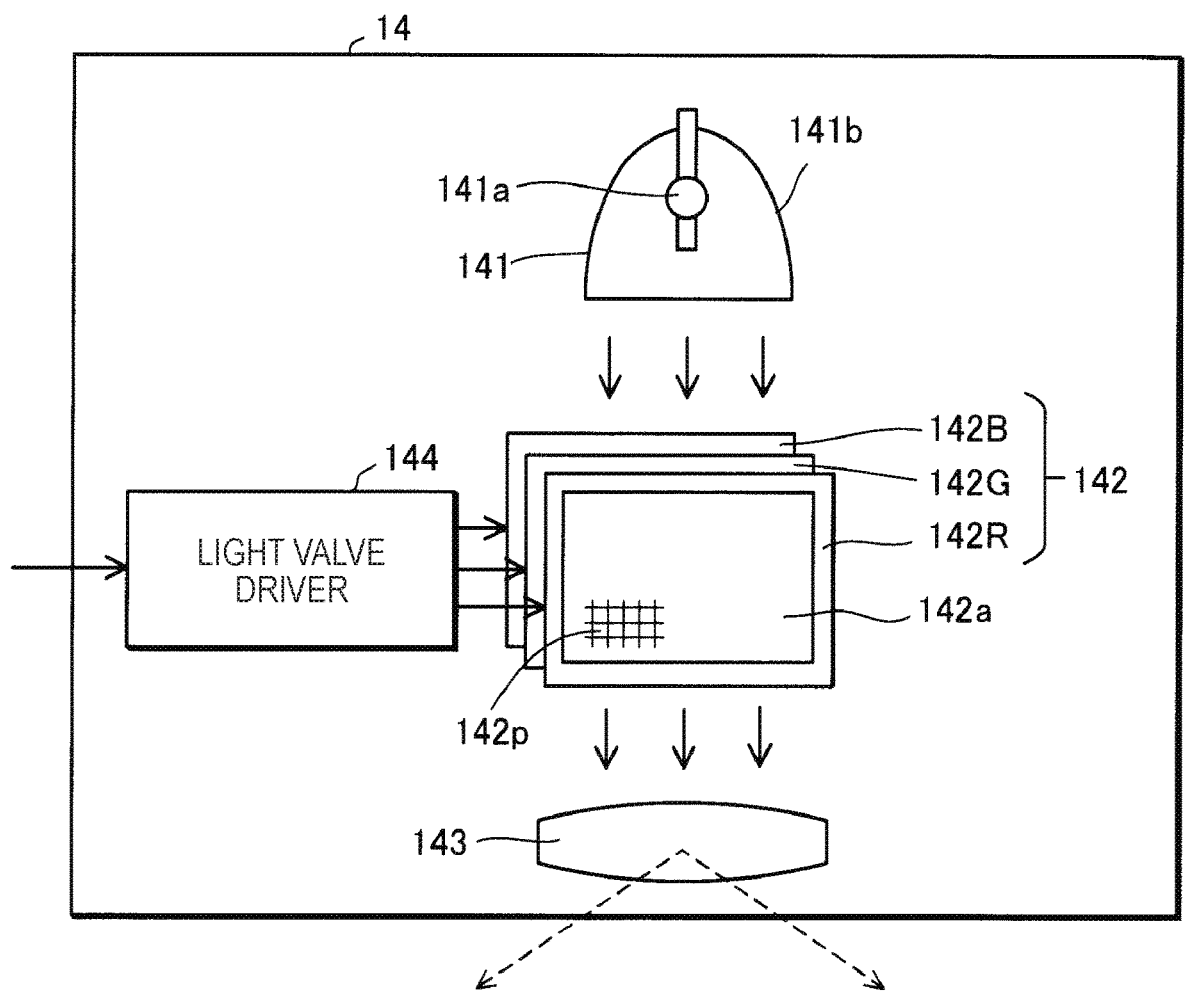
FIG. 9 shows an example of a projection section.

FIG. 9 shows an example of the projection section 14. The projection section 14 includes a light source 141, three liquid crystal light valves 142 (142R, 142G, and 142B), which are an example of a light modulator, a projection lens 143, which is an example of a projection system, a light valve driver 144, and other components. In the projection section 14, the liquid crystal light valves 142 modulate light outputted from the light source 141 to form the projection image 100a (image light), and the projection lens 143 enlarges and projects the projection image 100a. The projection image 100a is displayed on the projection screen SC.

The light source 141 includes a light source section 141a, which is formed, for example, of a xenon lamp, an ultrahigh-pressure mercury lamp, an LED (light emitting diode), or a laser light source, and a reflector 141b, which reduces variation in the direction of light emitted by the light source section 141a. The light outputted from the light source 141 passes through an optical integration system that is not shown, where variation in the luminance distribution of the light is reduced, and the resultant light is then separated by a color separation system that is not shown into red (R), green (G), and blue (B) light components, which are the three primary colors of light. The R, G, and B light components are incident on the liquid crystal light valves 142R, 142G, and 142B, respectively.

The liquid crystal light valves 142 are each formed, for example, of a liquid crystal panel in which a liquid crystal material is encapsulated between a pair of transparent substrates. The liquid crystal light valves 142 each have a rectangular pixel area 142a formed of a plurality of pixels 142p arranged in a matrix. In each of the liquid crystal light valves 142, drive voltage is applicable to the liquid crystal material for each of the pixels 142p. The light valve driver 144 applies drive voltage according to partial image information inputted from the processing section 17 to each of the pixels 142p, and the pixel 142p has light transmittance set in accordance with the partial image information. The light outputted from the light source 141 is therefore modulated when passing through the pixel areas 142a to form a projection image according to the partial image information on a color basis.

The color images are combined with one another by a light combining system that is not shown for each of the pixels 142p, and projection image light (projection images) that is color image light (color image) is generated. The projection image light is enlarged and projected by the projection lens 143 onto the projection surface SC.

Referring back to FIG. 8, the acceptance section 15 is an operation button group including a rightward arrow button and a leftward arrow button. The acceptance section 15 is not limited to the operation button group including a rightward arrow button and a leftward arrow button and can be changed as appropriate.

The acceptance section 15 accepts an adjustment content relating to the settings of the projector set by using the adjustment image G21. For example, in the case where the combined image G3 shown in FIG. 1 is displayed, and when the rightward arrow button is operated, the acceptance section 15 accepts an adjustment content that causes the brightness of the projection image 100a to be higher than the current value. When the leftward arrow button is operated, the acceptance section 15 accepts an adjustment content that causes the brightness of the projection image 100a to be lower than the current value.

An adjustment content accepted during the overall adjustment is used to adjust the projectors 100 to 400. On the other hand, an adjustment content accepted during the individual adjustment is used to adjust only the projector 100.

The storage section 16 is a computer readable recording medium. The storage section 16 is, for example, a flash memory. The storage section 16 is not limited to a flash memory and can be changed as appropriate. The storage section 16 stores, for example, a variety of pieces of information and a program executed by the processing section 17.

The processing section 17 is, for example, a computer, such as a CPU (central processing unit). The processing section 17 may be formed of one or more processors. The processing section 17 reads and executes the program stored in the storage section 16 to achieve an OSD image generator 171, a combined image generator 172, a projection image generator 173, an adjuster 174, and a provider 175.

The OSD image generator 171 is an example of a switching section. The OSD image generator 171 generates OSD image information representing an OSD image G2. For example, the OSD image generator 171 uses information on OSD stored in the storage section 16 to generate the OSD image information.

The OSD image generator 171 switches the aspect of the OSD image in the specific situation in accordance with the adjustment instruction I received by the instruction receiving section 12. For example, the OSD image generator 171 switches the number of adjustment images G21 in the OSD image to another in accordance with the adjustment instruction I.

The OSD image generator 171 sets the aspect of the OSD image to be the aspect in which the OSD image shows only one adjustment image G21 (see FIG. 3) in the case where the adjustment instruction I indicates the overall adjustment.

On the other hand, in the case where the adjustment instruction I indicates the individual adjustment, the OSD image generator 171 sets the aspect of the OSD image to be the aspect in which the OSD image shows at least two adjustment images G21 (see FIG. 5). In the present embodiment, the OSD image generator 171 sets the aspect of the OSD image in such a way that the adjustment image G21 is displayed in each of the partial images (projection images) projected by the projectors 100 to 400 in the case where the adjustment instruction I indicates the individual adjustment, as shown in FIG. 5.

The combined image generator 172 uses the image information G1a and the OSD image information to generate combined image information representing a combined image (combined image G3 or G4, for example) that is the image G1 on which an OSD image (OSD image G2a or G2b, for example) has been superimposed.

The projection image generator 173 generates partial image information representing the partial image for which the projector 100 is responsible (hereinafter referred to as "first partial image information").

In the present embodiment, the projection image generator 173 uses first identification information, which identifies the partial image for which the projector 100 is responsible (hereinafter referred to as "first partial image") out of the combined image, and the combined image information to generate the first partial image information. Specifically, the projection image generator 173 reads the first partial image identified by the first identification information from the combined image and generates the first partial image information representing the first partial image. The first identification information is stored in the storage section 16. The first identification information is information for identifying the position of the first partial image (partial image G31 or G41, for example) in the combined image. The first identification information is set, for example, by the user.

The projection image generator 173 outputs the first partial image information to the projection section 14. The projection section 14 projects the first partial image on the projection surface SC in accordance with the first partial image information.

The adjuster 174 adjusts the settings of the projector 100 based on the adjustment content accepted by the acceptance section 15. For example, in a case where the acceptance section 15 accepts the adjustment content that causes the brightness of the projection image 100a to be higher than the current value, the adjuster 174 controls the projection image generator 173 to adjust the first partial image information in such a way that the brightness of the projection image 100a indicated by the first partial image information is higher than the current value.

The provider 175 uses the communication section 13 to provide the projector 200 with the combined image information (combined image information G3a or G4a, for example). The provider 175 further uses the communication section 13 to provide the projector 200 with the adjustment content accepted during the overall adjustment. The provider 175 does not provide the projector 200 with the adjustment content accepted during the individual adjustment.

Figure 10:
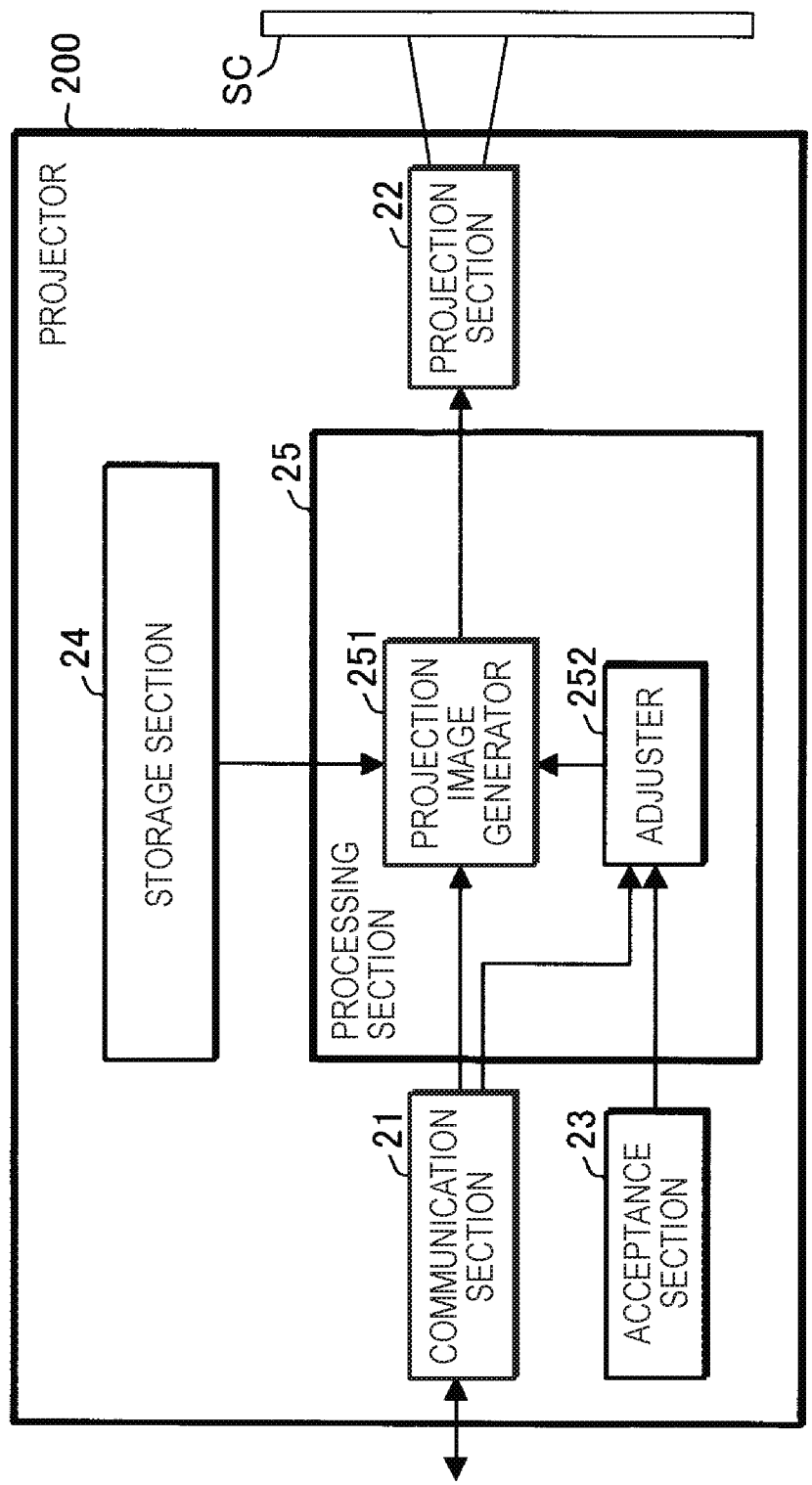
FIG. 10 shows an example of another projector.

FIG. 10 shows an example of the projector 200. The projector 200 includes a communication section 21, a projection section 22, an acceptance section 23, a storage section 24 and a processing section 25.

The communication section 21 communicates with the projectors 100 and 300. For example, the communication section 21 receives the combined image information (combined image information G3a or G4a, for example) from the projector 100. The communication section 21 transmits the combined image information (combined image information G3a or G4a, for example) to the projector 300.

The projection section 22 projects and displays the partial image for which the projector 200 is responsible (partial image G32 or G42, for example) on the projection surface SC. The projection section 22 has the same configuration as that of the projection section 14. The projection section 22 will therefore not be described in detail.

The acceptance section 23 has the same configuration as that of the acceptance section 15. The acceptance section 23 will therefore not be described in detail.

The storage section 24 is a computer readable recording medium. The storage section 24 is, for example, a flash memory. The storage section 24 is not limited to a flash memory and can be changed as appropriate. The storage section 24 stores, for example, a variety of pieces of information and a program executed by the processing section 25.

The processing section 25 is, for example, a computer, such as a CPU. The processing section 25 may be formed of one or more processors. The processing section 25 reads and executes the program stored in the storage section 24 to achieve a projection image generator 251 and an adjuster 252.

The projection image generator 251 uses the combined image information provided from the projector 100 to generate partial image information representing the partial image for which the projector 200 is responsible (hereinafter also referred to as "second partial image information").

In the present embodiment, the projection image generator 251 uses second identification information, which identifies the partial image for which the projector 200 is responsible (hereinafter referred to as "second partial image") out of the combined image, and the combined image information to generate the second partial image information. Specifically, the projection image generator 251 reads the second partial image identified by the second identification information from the combined image and generates the second partial image information representing the second partial image. The second identification information is stored in the storage section 24. The second identification information is information for identifying the position of the second partial image in the combined image. The second identification information is set, for example, by the user.

The projection image generator 251 outputs the second partial image information to the projection section 22. The projection section 22 projects the second partial image on the projection surface SC in accordance with the second partial image information.

The projector 300 has the same configuration as that of the projector 200 except that the projector 300 uses third identification information in place of the second identification information. The projector 300 will therefore not be described in detail.

The third identification information is information that identifies the partial image for which the projector 300 is responsible (hereinafter referred to as "third partial image") out of the combined image. The projector 300 uses the combined image information and the third identification information to identify the third partial image and projects the third partial image onto the projection surface SC.

The projector 400 has the same configuration as that of the projector 200 except that the projector 400 uses fourth identification information in place of the second identification information. The projector 400 will therefore not be described in detail.

The fourth identification information is information that identifies the partial image for which the projector 400 is responsible (hereinafter referred to as "fourth partial image") out of the combined image. The projector 400 uses the combined image information and the fourth identification information to identify the fourth partial image and projects the fourth partial image onto the projection surface SC.

The actions of the projectors will next be described.

Figure 11:
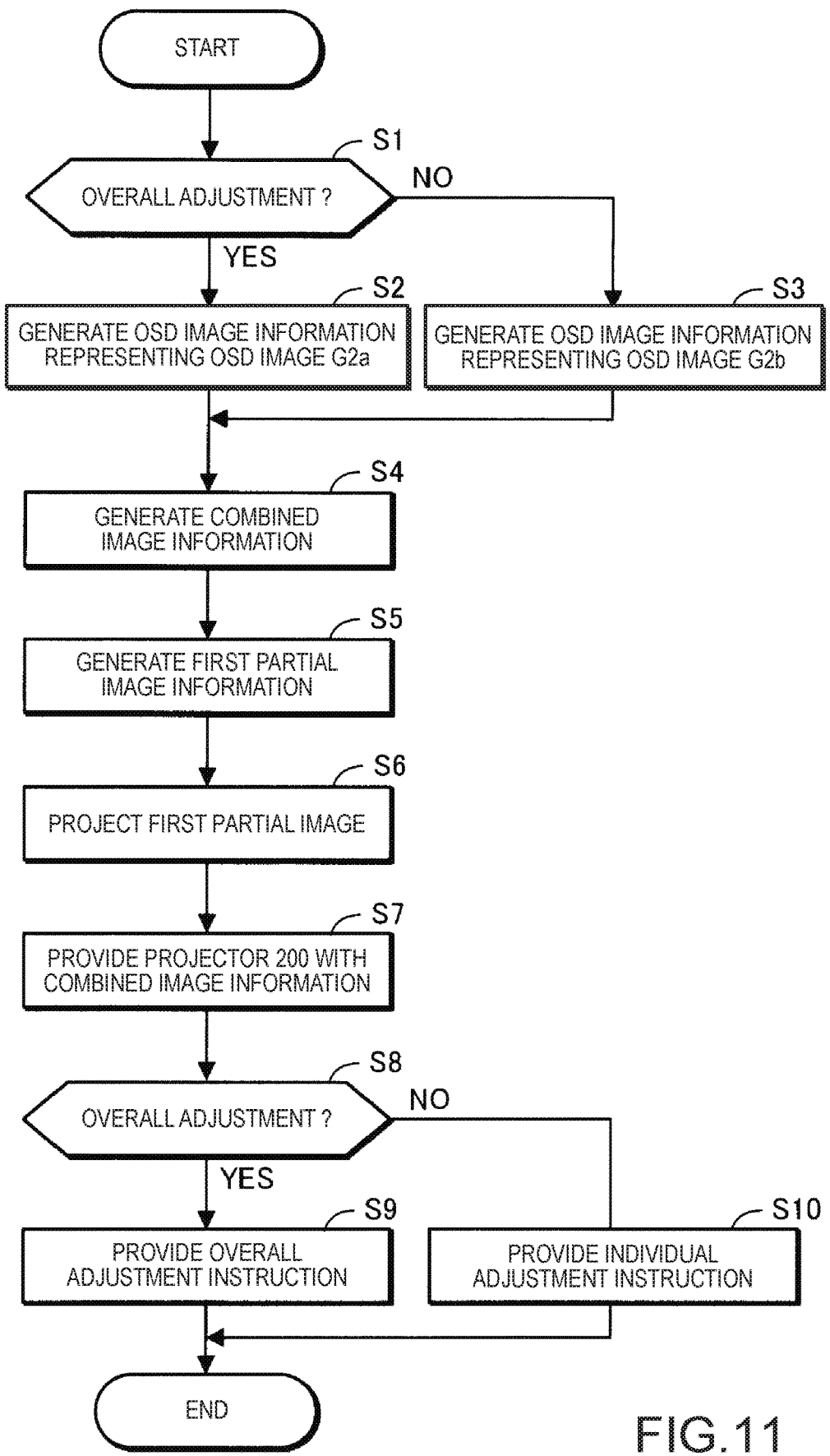
FIG. 11 is a flowchart for describing the action of the projector.

FIG. 11 is a flowchart for describing the action of the projector 100, specifically, the action of projecting the first partial image. It is assumed that the image information G1*a* has been inputted to the projector 100 and the instruction receiving section 12 has received the adjustment instruction I.

In the case where the adjustment instruction I indicates the overall adjustment (YES in step S1), the OSD image generator 171 generates OSD image information representing the OSD image G2*a* (see FIG. 3) (step S2).

On the other hand, in the case where the adjustment instruction I indicates the individual adjustment (NO in step S1), the OSD image generator 171 generates OSD image information representing the OSD image G2*b* (see FIG. 5) (step S3).

When the OSD image generator 171 generates the OSD image information, the combined image generator 172 uses the image information G1*a* and the OSD image information to generate the combined image information representing the combined image that is the image G1 on which the OSD image has been superimposed (combined image information G3*a* or G4*a*, for example) (step S4).

The projection image generator 173 subsequently determines the first partial image identified by the first identification information from the combined image and generates the first partial image information representing the first partial image (step S5). The projection image generator 173 outputs the first partial image information to the projection section 14.

The projection section 14 projects and displays the first partial image on the projection surface SC based on the first partial image information (step S6).

The provider 175 subsequently uses the communication section 13 to provide the projector 200 with the combined image information (step S7).

Subsequently, in the case of the overall adjustment (YES in step S8), the provider 175 uses the communication section 13 to provide the projector 200 with an overall adjustment instruction that instructs the overall adjustment (step S9). On the other hand, in the case of the individual adjustment (NO in step S8), the provider 175 uses the communication section 13 to provide the projector 200 with an individual adjustment instruction that instructs the individual adjustment (step S10).

The projection image generator 251 of the projector 200, when it accepts the overall adjustment instruction via the communication section 21, sets an adjustment mode to be an overall adjustment mode, and the communication section 21 then provides the projector 300 with the overall adjustment instruction.

The projection image generator 251 of the projector 200, when it accepts the individual adjustment instruction via the communication section 21, sets the adjustment mode to be an individual adjustment mode, and the communication section 21 then provides the projector 300 with the individual adjustment instruction.

Also in the projectors 300 and 400, the adjustment mode is set as follows, as in the projector 200.

The projector 300, when it receives the overall adjustment instruction from the projector 200, sets the adjustment mode to be the overall adjustment mode and provides the projector 400 with the overall adjustment instruction. On the other hand, the projector 300, when it receives the individual adjustment instruction from the projector 200, sets the adjustment mode to be the individual adjustment mode and provides the projector 400 with the individual adjustment instruction.

The projector 400, when it receives the overall adjustment instruction from the projector 300, sets the adjustment mode to be the overall adjustment mode but does not provide any of the projectors with the overall adjustment instruction. On the other hand, the projector 400, when it receives the individual adjustment instruction from the projector 300, sets the adjustment mode to be the individual adjustment mode but does not provide any of the projectors with the individual adjustment instruction.

Figure 12:
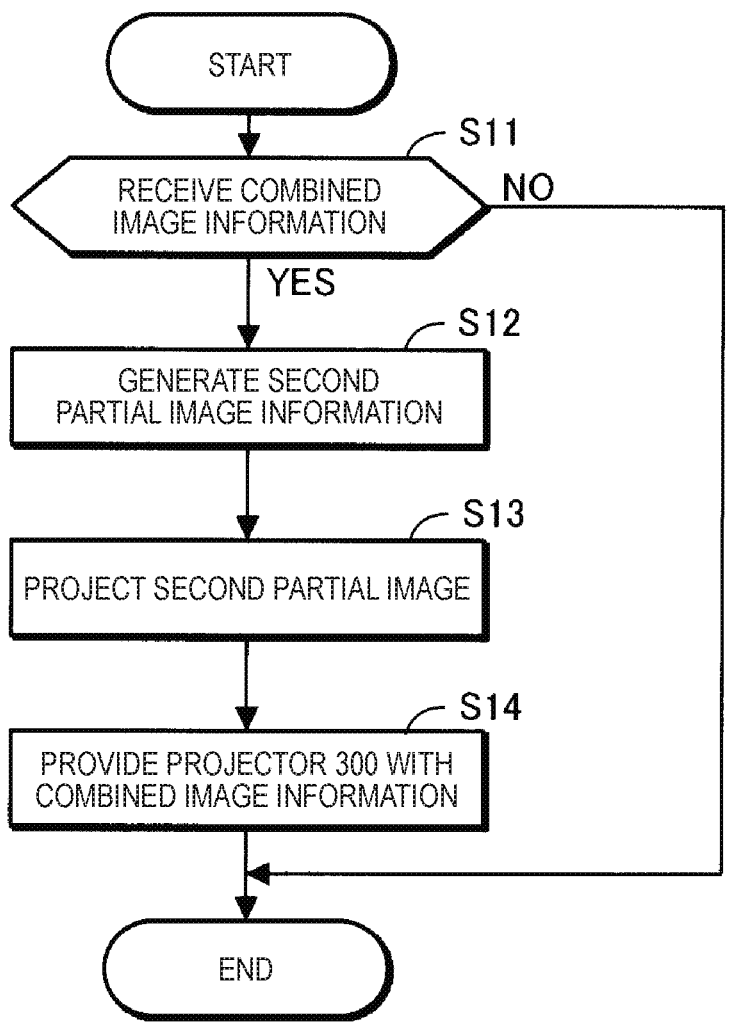
FIG. 12 is a flowchart for describing an action of the other projector.

FIG. 12 is a flowchart for describing the action of the projector 200, specifically, the action of projecting the second partial image.

When the communication section 21 receives the combined image information from the projector 100 (YES in step S11), the projection image generator 251 uses the second identification information and the combined image information to generate the second partial image information (step S12). The projection image generator 251 subsequently outputs the second partial image information to the projection section 22.

The projection section 22 projects and displays the second partial image on the projection surface SC based on the second partial image information (step S13).

The communication section 21 subsequently provides the projector 300 with the combined image information (step S14).

The third partial image projection action of the projector 300 will next be described. The third partial image projection action of the projector 300 only differs from the second partial image projection action of the projector 200 in terms of the following points but is otherwise the same as the second partial image projection action of the projector 200. The projector 300 generates the third partial image information in place of the second partial image information in step S12 (see FIG. 12), projects the third partial image in place of the second partial image in step S13, and provides the projector 400 in place of the projector 300 with the combined image information in step S14.

The fourth partial image projection action of the projector 400 will next be described. The fourth partial image projection action of the projector 400 only differs from the second partial image projection action of the projector 200 in terms of the following points but is otherwise the same as the second partial image projection action of the projector 200. The projector 400 generates the fourth partial image information in place of the second partial image information in step S12, projects the fourth partial image in place of the second partial image in step S13, and does not carry out step S14.

As described above, in the multi-projection system 1, the projector 100, and the method for controlling the projector 100 according to the present embodiment, the aspect of an OSD image is switched from one to the other in accordance with the adjustment instruction I, which represents one of the overall adjustment and the individual adjustment. The user can therefore determine whether the OSD image is an image for the overall adjustment or for the individual adjustment based on the aspect of the OSD image.

Further, in the multi-projection system 1, the projector 100, and the method for controlling the projector 100 according to the present embodiment, the projectors 200 to 400 each use combined image information generated by the projector 100 to project a partial image. The projectors 200 to 400 therefore need to perform no OSD image superimposition. The processing burden can therefore be reduced as compared with a multi-projection system in which the projectors 100 to 400 each perform the superimposition.

The action of adjusting the settings of a projector by using an OSD image (hereinafter also referred to as "setting adjustment action") will next be described.

Figure 13:
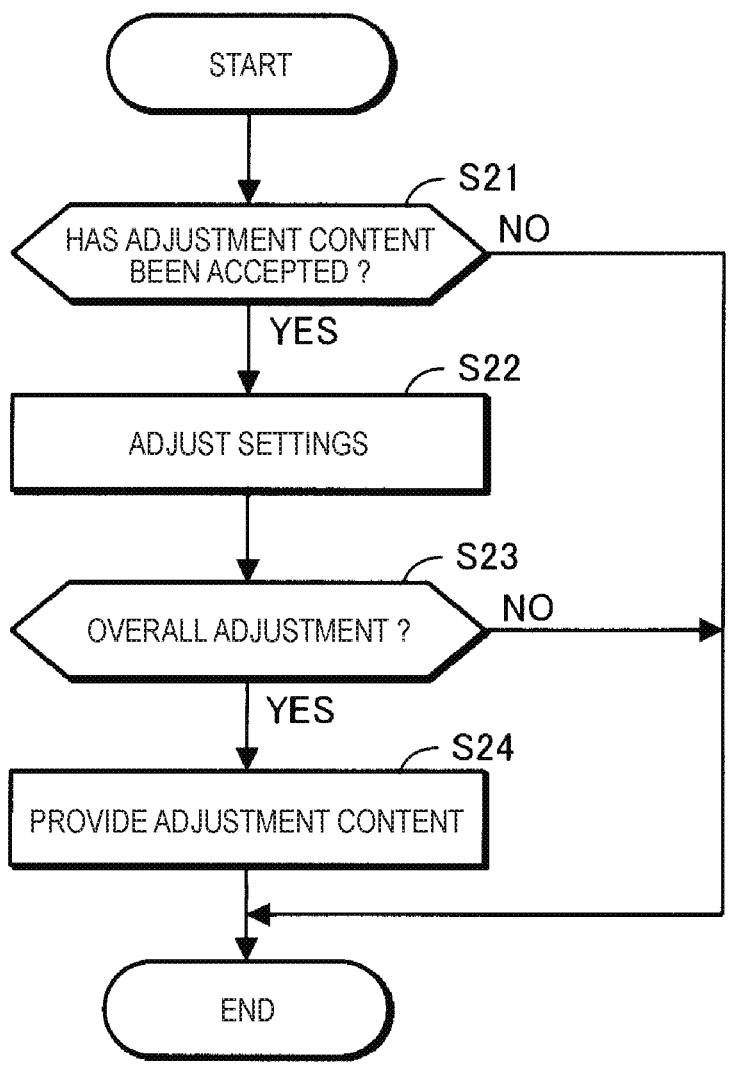
FIG. 13 is a flowchart for describing another action of the projector.

FIG. 13 is a flowchart for describing the setting adjustment action of the projector 100.

In a situation in which the adjustment image G21 is displayed on the projection surface SC, and when the acceptance section 15 accepts an adjustment content (YES in step S21), the adjuster 174 adjusts the settings of the projector 100 based on the adjustment content (step S22). For example, in a case where the acceptance section 15 accepts the adjustment content that causes the brightness of the projection image 100a to be lower than the current value, the adjuster 174 controls the projection image generator 173 to adjust the first partial image information in such a way that the brightness of the projection image 100a indicated by the first partial image information is lower than the current value.

Subsequently, in the case of the overall adjustment (YES in step S23), the provider 175 uses the communication section 13 to provide the projector 200 with the adjustment content (step S24). On the other hand, in the case of the individual adjustment (NO in step S23), the provider 175 does not provide the adjustment content but terminates the action shown in FIG. 13. That is, the adjustment content accepted by the projector 100 is provided to the projector 200 only in the overall adjustment.

Figure 14:
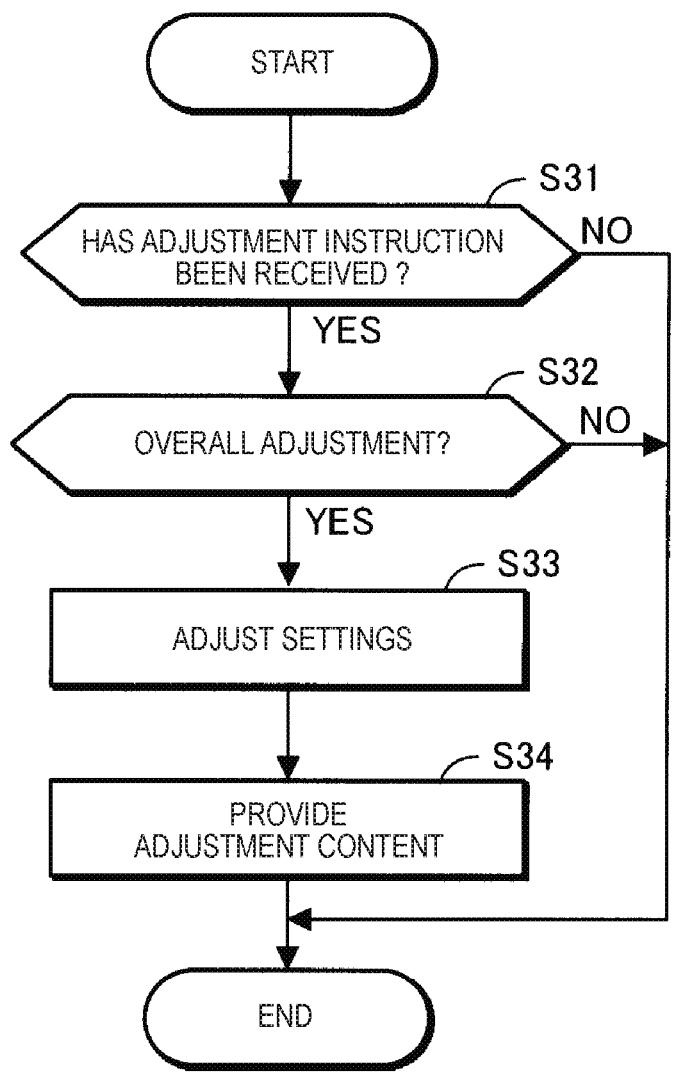
FIG. 14 is a flowchart for describing another action of the other projector.

FIG. 14 is a flowchart for describing the setting adjustment action in a case where the projector 200 receives the adjustment instruction from the projector 100. When the communication section 21 receives the adjustment instruction from the projector 100 (YES in step S31), and in the case where the adjustment mode is the overall adjustment mode (YES in step S32), the adjuster 252 controls the projection image generator 251 to adjust the settings of the projector 200 based on the adjustment content supplied from the projector 100 (step S33). The communication section 21 subsequently provides the projector 300 with the adjustment content (step S34).

On the other hand, when the communication section 21 receives the adjustment instruction from the projector 100 (YES in step S31), and in the case where the adjustment mode is the individual adjustment mode (NO in step S32), the adjuster 252 terminates the action shown in FIG. 14.

The setting adjustment action in a case where the projector 300 receives the adjustment instruction from the projector 200 will next be described. The action of the projector 300 in this case only differs from the action of the projector 200 when it receives the adjustment instruction in terms of the following points but is otherwise the same as the action of the projector 200.

The projector 300 adjusts the settings of the projector 300 based on the adjustment content provided from the projector 200 in step S33 (see FIG. 14) and provides the projector 400 with the adjustment content in step S34.

The setting adjustment action in a case where the projector 400 receives the adjustment instruction from the projector 300 will next be described. The action of the projector 400 in this case only differs from the action of the projector 200 when it receives the adjustment instruction in terms of the following points but is otherwise the same as the action of the projector 200.

The projector 400 adjusts the settings of the projector 400 based on the adjustment content provided from the projector 300 in step S33 (see FIG. 14) and does not carry out step S34.

As described above, in the present embodiment, the settings of the projectors 100 to 400 can be adjusted based on an adjustment content accepted by the projector 100. The settings of a plurality of projectors can therefore be adjusted altogether.

Figure 15:
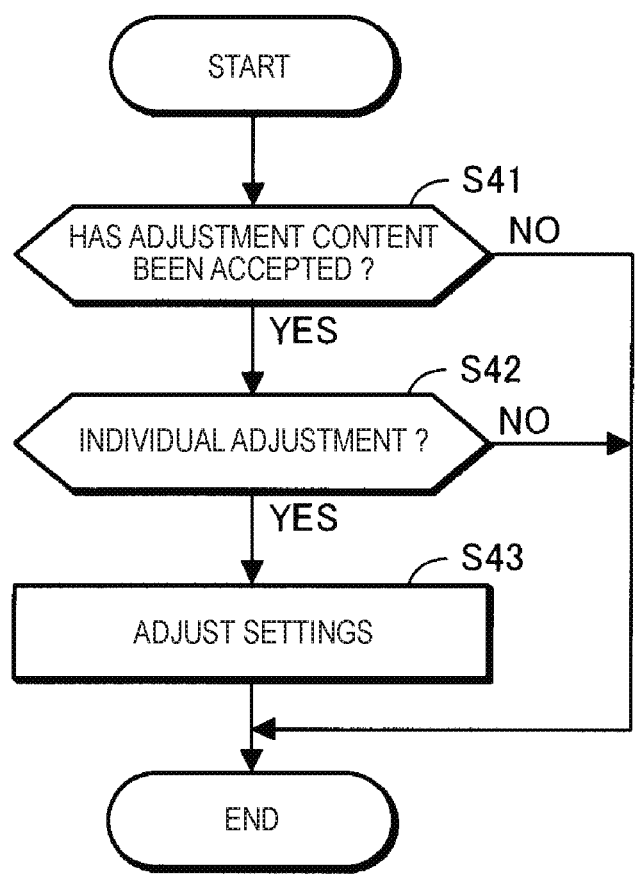
FIG. 15 is a flowchart for describing another action of the other projector.

FIG. 15 is a flowchart for describing the setting adjustment action in a case where the projector 200 accepts an adjustment content from the user.

When the acceptance section 23 accepts an adjustment content from the user (YES in step S41), and in the case where the adjustment mode is the individual adjustment mode (YES in step S42), the adjuster 252 adjusts the settings of the projector 200 based on the adjustment content (step S43).

On the other hand, when the acceptance section 23 accepts the adjustment content from the user (YES in step S41), and in the case where the adjustment mode is the overall adjustment mode (NO in step S42), the adjuster 252 does not adjust the setting of the projector 200 based on the adjustment content but terminates the action shown in FIG. 15.

The setting adjustment action in a case where the projector 300 accepts an adjustment content from the user and the setting adjustment action in a case where the projector 400 accepts an adjustment content from the user are the same as the action of the projector 200 when it receives an adjustment content.

As described above, in the present embodiment, the settings of the projectors 100 to 400 can also be individually adjusted.

Variations

The invention is not limited to the embodiment described above, and a variety of variations, for example, those that will be described below, are conceivable. Further, one or more variations arbitrarily selected from the following aspects of variations can be combined with one another as appropriate.

Variation 1

In the embodiment described above, the projector 100 generates combined image information representing a combined image that is the image G1 on which an OSD image has been superimposed, and the projectors 200 to 400 each use the combined image information to project a partial image.

Instead, the projectors 100 to 400 may each superimpose the OSD image on the image G1 to generate the partial image.

Variation 2

In the embodiment described above, in the case where the adjustment instruction I indicates the individual adjustment, the OSD image generator 171 sets the aspect of the OSD image in such a way that the adjustment image G21 is displayed in the partial image (projection image) projected by each of the projectors 100 to 400.

Instead, in the case where the adjustment instruction I indicates the individual adjustment, the OSD image generator 171 may set the aspect of the OSD image to be an aspect in which the adjustment image G21 is contained in the partial image (projection image) projected by each of at least two of the projectors 100 to 400.

For example, in the case where the adjustment instruction I indicates the individual adjustment, the OSD image generator 171 may set the aspect of the OSD image in such a way that the projection images 100a and 300a each contain the adjustment image G21 but the projection images 200a and 400a each contain no adjustment image G21.

In this case, the instruction receiving section 12 may accept a projector specifying information specifying a projector that projects a projection image containing the adjustment image G21, and the OSD image generator 171 may set the aspect of the OSD image in such a way that the adjustment image G21 is contained in the projection image projected by the projector specified by the projector specifying information. The projector specified by the projector specifying information is desirably a projector that is a target of the individual adjustment.

Variation 3

The resolution of the OSD image may differ from the resolution of the image G1.

Variation 4

The position and size of the adjustment image G21 in a combined image during the overall adjustment are not limited to those shown in FIG. 4 and can be changed as appropriate.

Figure 16:
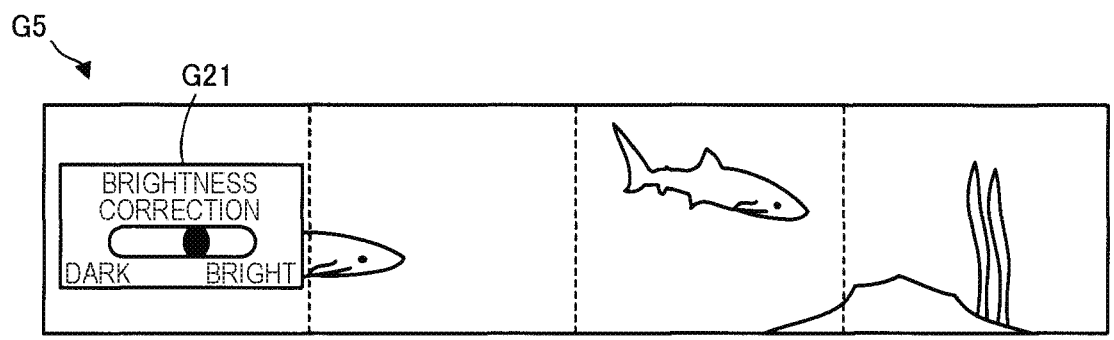
FIG. 16 shows another example of the combined image during the overall adjustment.

FIG. 16 shows another example of the combined image (combined image G5) during the overall adjustment. In the example shown in FIG. 16, no adjustment image G21 is present in the projection image projected by each of the projectors 200 to 400, but the single adjustment image G21 falls within the projection image 100a projected by the projector 100. To this end, the projector 100 may provide the projector 200 with the image information G1a representing an image on which no OSD image is superimposed in place of the combined image information, and the projectors 200 to 400 may use the image information G1a in place of the combined image information.

Figure 17:
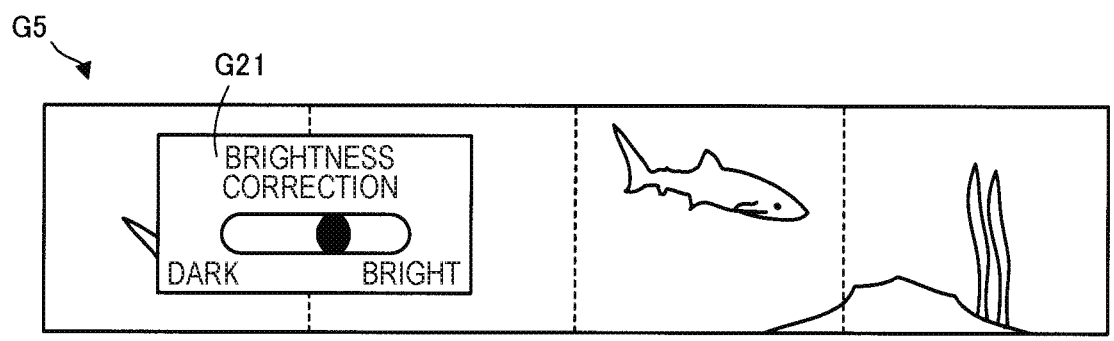
FIG. 17 shows still another example of the combined image during the overall adjustment.

FIG. 17 shows still another example of the combined image (combined image G5) during the overall adjustment. In the example shown in FIG. 17, no adjustment image G21 is present in the projection image projected by each of the projectors 300 to 400, but the single adjustment image G21 straddles two images, the projection image 100a projected by the projector 100 and the projection image 200a projected by the projector 200.

Variation 5

In a case where the projector 100 stores the second identification information, the provider 175 may provide the projector 200 with the second identification information. The projector 200 (specifically, projection image generator 251) uses the second identification information and the combined image information provided from the projector 100 to generate the second partial image information.

In this case, the projector 100 can specify the partial image projected by the projector 200.

Further, for example, the projector 200 can use one piece of identifying information to identify an image portion for which the projector 200 is responsible out of the image G1 and an image portion for which the projector 200 is responsible out of the OSD image and can therefore use the common information to identify the image portions.

Variation 6

The projection sections 14 and 22 each use liquid crystal light valves as the light modulator, and the light modulator is not necessarily formed of liquid crystal light valves and can be changed as appropriate. For example, the light modulator may instead be configured to use three reflective liquid crystal panels. The light modulator may still instead, for example, be configured to use one liquid crystal panel, three digital mirror devices (DMDs), or one digital mirror device. In the case where only one liquid crystal panel or DMD is used as the light modulator, no members corresponding to the color separation system and the light combining system are required. Further, a configuration including no liquid crystal panel or DMD but capable of modulating light emitted by a light source can be employed as the light modulator.

Variation 7

The entirety or part of the elements achieved when each of the processing sections 17 and 25 execute the program may be achieved by hardware formed, for example, of a field programmable gate array (FPGA), an application specific IC (ASIC), or any other electronic circuit or may be achieved by software and hardware that cooperate with each other.

What is claimed is:

1. A multi-projection system that combines projection images projected by a plurality of projectors to allow an image containing an on-screen display (OSD) image for adjustment of the projectors to be displayed on a projection surface, the multi-projection system comprising:
   an instruction receiving section that receives an adjustment instruction indicating one of first adjustment in which the plurality of projectors are adjusted altogether and second adjustment in which the plurality of projectors are individually adjusted; and
   a processor functioning as a switching section that switches an aspect of the OSD image to another in accordance with the adjustment instruction,
   wherein the OSD image contains a number of simultaneously shown adjustment images of a corresponding number of different projectors, each of the adjustments images being configured to adjust a display setting used in a respective one of the number of the different projectors,
   the switching section switches the number of adjustment images simultaneously shown in the OSD image from one number to another number in accordance with the adjustment instruction,
   a combined projection image combined by the projection images projected by the plurality of projections includes a first partial image identified at a position in the combined projection image by a first identification information and a second partial image identified at a position in the combined projection image by a second identification information, and
   the switching section sets the aspect of the OSD image to be an aspect in which the OSD image contains one adjustment image and the one adjustment image straddles the first partial image and the second partial image in the case where the adjustment instruction indicates the first adjustment, whereas the switching section sets the aspect of the OSD image to be an aspect in which each of the first partial image and the second partial image contains the adjustment images in the case where the adjustment instruction indicates the second adjustment.

2. The multi-projection system according to claim 1, wherein the switching section sets the aspect of the OSD image to be an aspect in which the OSD image contains one adjustment image in the case where the adjustment instruction indicates the first adjustment, whereas the switching section sets the aspect of the OSD image to be an aspect in which the projection images projected by at least two of the plurality of projectors contain the adjustment images in the case where the adjustment instruction indicates the second adjustment.

3. The multi-projection system according to claim 2, wherein the aspect in which the OSD image contains one adjustment image is an aspect in which the one adjustment image straddles the projection images projected by the at least two of the plurality of projectors.

4. The multi-projection system according to claim 2, wherein the aspect in which the OSD image contains one adjustment image is an aspect in which the one adjustment image falls within the projection image projected by one of the plurality of projectors.

5. The multi-projection system according to claim 1, wherein a first projector that is one of the plurality of projectors includes
an acceptance section that accepts an adjustment content set by using the OSD image, and
another processor functioning as
an adjuster that adjusts settings of the projector based on the adjustment content, and
a provider that provides a second projector different from the first projector out of the plurality of projectors with the adjustment content in the case where the adjustment instruction indicates the first adjustment.

6. The multi-projection system according to claim 5, wherein the provider does not provide the second projector with the adjustment content in the case where the adjustment instruction indicates the second adjustment.

7. A projector that is allowed to belong to a multi-projection system that combines projection images projected by a plurality of projectors to allow an image containing an on-screen display (OSD) image for adjustment of the projectors to be displayed on a projection surface, the projector comprising:
an instruction receiving section that receives an adjustment instruction indicating one of first adjustment in which the plurality of projectors are adjusted altogether and second adjustment in which the plurality of projectors are individually adjusted in a specific situation in which the projector belongs to the multi-projection system; and
a processor functioning as a switching section that switches an aspect of the OSD image to another in accordance with the adjustment instruction in the specific situation,
wherein the OSD image contains a number of simultaneously shown adjustment images of a corresponding number of different projectors, each of the adjustments images being configured to adjust a display setting used in a respective one of the number of the different projectors,
the switching section switches the number of adjustment images simultaneously shown in the OSD image from one number to another number in accordance with the adjustment instruction,
a combined projection image combined by the projection images projected by the plurality of projections includes a first partial image identified at a position in the combined projection image by a first identification information and a second partial image identified at a position in the combined projection image by a second identification information, and
the switching section sets the aspect of the OSD image to be an aspect in which the OSD image contains one adjustment image and the one adjustment image straddles the first partial image and the second partial image in the case where the adjustment instruction indicates the first adjustment, whereas the switching section sets the aspect of the OSD image to be an aspect in which each of the first partial image and the second partial image contains the adjustment images in the case where the adjustment instruction indicates the second adjustment.

8. The projector according to claim 7, wherein the switching section sets the aspect of the OSD image to be an aspect in which the OSD image contains one adjustment image in the case where the adjustment instruction indicates the first adjustment, whereas the switching section sets the aspect of the OSD image to be an aspect in which the projection images projected by at least two of the plurality of projectors contain the adjustment images in the case where the adjustment instruction indicates the second adjustment.

9. The projector according to claim 8, wherein the aspect in which the OSD image contains one adjustment image is an aspect in which the one adjustment image straddles the projection images projected by the at least two of the plurality of projectors.

10. The projector according to claim 8, wherein the aspect in which the OSD image contains one adjustment image is an aspect in which the one adjustment image falls within the projection image projected by one of the plurality of projectors.

11. The projector according to claim 7, further comprising:
an acceptance section that accepts an adjustment content set by using the OSD image; and
another processor functioning as
an adjuster that adjusts settings of the projector based on the adjustment content; and
a provider that provides another projector different from the projector out of the plurality of projectors with the adjustment content in the case where the adjustment instruction indicates the first adjustment.

12. The projector according to claim 11, wherein the provider does not provide the other projector with the adjustment content in the case where the adjustment instruction indicates the second adjustment.

13. A method for controlling a projector that is allowed to belong to a multi-projection system that combines projection images projected by a plurality of projectors to allow an image containing an on-screen display (OSD) image for adjustment of the projectors to be displayed on a projection surface, the method comprising:
receiving an adjustment instruction indicating one of first adjustment in which the plurality of projectors are adjusted altogether and second adjustment in which the plurality of projectors are individually adjusted in a specific situation in which the projector belongs to the multi-projection system; and switching an aspect of the OSD image to another in accordance with the adjustment instruction in the specific situation, wherein the OSD image contains a number of simultaneously shown adjustment images of a corresponding number of different projectors, each of the adjustments images being configured to adjust a display setting used in a respective one of the number of the different projectors, a-ad the switching step includes switching the number of adjustment images simultaneously shown in the OSD image from one number to another number in accordance with the adjustment instruction, a combined projection image combined by the projection images projected by the plurality of projections includes a first partial image identified at a position in the combined projection image by a first identification information and a second partial image identified at a position in the combined projection image by a second identification information, and the switching step includes setting the aspect of the OSD image to be an aspect in which the OSD image contains one adjustment image and the one adjustment image straddles the first partial image and the second partial image in the case where the adjustment instruction indicates the first adjustment, and setting the aspect of the OSD image to be an aspect in which each of the first partial image and the second partial image contains the adjustment images in the case where the adjustment instruction indicates the second adjustment.

* * * * *